ional Patent Documents, -->

United States Patent
Huang et al.

(10) Patent No.: US 9,223,078 B2
(45) Date of Patent: Dec. 29, 2015

(54) POSITIONING SIGNAL TRANSMITTER MODULE AND ELECTRONIC PRODUCT WITH CURSOR-CONTROLLABLE FUNCTION

(75) Inventors: Chao-Chien Huang, Hsinchu (TW);
Chun-Yi Lu, Hsinchu (TW);
Meng-Huan Hsieh, Hsinchu (TW)

(73) Assignee: PIXART IMAGING INC., Hsinchu (TW)

( * ) Notice: Subject to any disclaimer, the term of this patent is extended or adjusted under 35 U.S.C. 154(b) by 180 days.

(21) Appl. No.: 13/523,863

(22) Filed: Jun. 14, 2012

(65) Prior Publication Data
US 2013/0176215 A1    Jul. 11, 2013

(30) Foreign Application Priority Data
Jan. 5, 2012    (TW) .............................. 101100514 A

(51) Int. Cl.
*G02B 6/00*    (2006.01)
*F21V 8/00*    (2006.01)
*G09F 9/00*    (2006.01)
*G06F 3/0346*    (2013.01)

(52) U.S. Cl.
CPC ................ *G02B 6/0038* (2013.01); *G09F 9/00* (2013.01); *G02B 6/0068* (2013.01); *G06F 3/0346* (2013.01)

(58) Field of Classification Search
CPC ............ G02F 1/133603; G02B 6/0068; G02B 6/0038; G09F 9/00
USPC ................... 362/600; 398/106; 345/158, 175; 349/65
See application file for complete search history.

(56) References Cited

U.S. PATENT DOCUMENTS

| | | | | |
|---|---|---|---|---|
| 4,373,282 A | * | 2/1983 | Wragg | 40/546 |
| 4,729,185 A | * | 3/1988 | Baba | 40/546 |
| 8,291,346 B2 | * | 10/2012 | Kerr et al. | 715/856 |
| 8,511,882 B2 | * | 8/2013 | Wu et al. | 362/616 |
| 2006/0114119 A1 | | 6/2006 | Matsumura et al. | |
| 2008/0180396 A1 | * | 7/2008 | Lin et al. | 345/158 |
| 2010/0214270 A1 | * | 8/2010 | Lai et al. | 345/175 |
| 2010/0309407 A1 | * | 12/2010 | Shimura | 349/62 |
| 2011/0090515 A1 | | 4/2011 | Hasenohr | |
| 2012/0069266 A1 | * | 3/2012 | Parker et al. | 349/61 |
| 2013/0089334 A1 | * | 4/2013 | Lin | 398/106 |

FOREIGN PATENT DOCUMENTS

| | | |
|---|---|---|
| CN | 1782972 A | 6/2006 |
| JP | 2006-277552 A | 10/2006 |
| JP | 2011-258102 A | 12/2011 |
| TW | 201115413 A1 | 5/2011 |

* cited by examiner

*Primary Examiner* — Quan-Zhen Wang
*Assistant Examiner* — Xuemei Zheng
(74) *Attorney, Agent, or Firm* — Cheng-Ju Chiang

(57) ABSTRACT

A positioning signal transmitter module, adapted to use with a cursor-controlling device corporately for a cursor controlling, includes a light-guide element and at least one light source. The light-guide element has a light-emission surface and at least one light-incidence surface adjacent to the light-emission surface. The light source is disposed beside the light-incidence surface(s), and each light source is configured to provide a light signal to its corresponding light-incidence surface. The light signal emits out from the light-emission surface. Moreover, an electronic product with a cursor-controllable function using the aforementioned positioning signal transmitter module is also provided.

11 Claims, 6 Drawing Sheets

POSITIONING SIGNAL TRANSMITTER MODULE AND ELECTRONIC PRODUCT WITH CURSOR-CONTROLLABLE FUNCTION

FIELD OF THE INVENTION

The present invention relates to a positioning signal transmitter module, and more particularly to a positioning signal transmitter module using light signals as positioning signals and an electronic product with a cursor-controllable function using the same.

BACKGROUND OF THE INVENTION

In recent years, display device with a thin-frame design has become a mainstream due to the advance in technology and high demands for compactness and lightweight. However, to have a cursor-controllable function, the display device is necessarily to equip with a positioning signal transmitter module, for providing positioning signals to a corresponding cursor-controlling device, disposed on a frame thereof. Therefore, if the positioning signal transmitter module has a relatively large size, the display device may not have a structure in response to the thin frame requirements.

FIG. 1 is a schematic structural view of a positioning signal transmitter module of prior art. As shown, the positioning signal transmitter module 100, exemplified by a light bar, includes a circuit board 110 and two light emitting diode (LED) groups 120. The two LED groups 120 are disposed respectively at two different positions on a same surface of the circuit board 110. Each LED group 120 includes dual-in-line-package (DIP) LEDs 122 (hereinafter referred to as DIP LED 122), and these DIP LEDs 122 are configured to emit light in various directions for providing positioning signals.

Because the positioning signal transmitter module 100 usually has a relatively large thickness D1 (for example, 10 mm); and thus, the display device provided with the positioning signal transmitter module 100 cannot have a thin-frame design.

SUMMARY OF THE INVENTION

Therefore, one object of the present invention is to provide a positioning signal transmitter module with a relatively thin thickness.

Another object of the present invention is to provide an electronic product with a cursors-controllable function adopting the aforementioned positioning signal transmitter module; and thus, the display apparatus of the electronic product can have a thin-frame structure.

The present invention provides a positioning signal transmitter module adapted to use with a cursor-controlling device corporately for a cursor controlling. The positioning signal transmitter module includes a light-guide element and at least one light source. The light-guide element has a light-emission surface and at least one light-incidence surface adjacent to the light-emission surface. The light source is disposed beside the light-incidence surface(s). Each light source is configured to provide a light signal to its corresponding light-incidence surface. The light signal emits out from the light-emission surface.

In an embodiment of the present invention, the light-incidence surface includes a first light-incidence surface and a second light-incidence surface opposite to the first light-incidence surface. The light-emission surface of the light-guide element includes a first light-emission area, a second light-emission area and a light-block area. The first light-emission area is adjacent to the first light-incidence surface. The second light-emission area is adjacent to the second light-incidence surface. The light-block area is formed between the first and the second light-emission areas. In addition, the first light-emission area is configured to have a size different to that of the second light-emission area.

In an embodiment of the present invention, the light-guide element includes a first light-guide part, a second light-guide part and a connection part. The first light-incidence surface and the first light-emission area each are one of surfaces of the first light-guide part. The second light-incidence surface and the second light-emission area each are one of surfaces of the second light-guide part. The connection part is connected between the first and the second light-guide parts, and the light-block area is one of surfaces of the connection part.

In an embodiment of the present invention, the light-guide element includes a light-guide part and a light-block layer. The light-guide part has the light-emission surface, the first light-incidence surface and the second light-incidence surface. The light-block layer is disposed on the light-emission surface of the light-guide part so as to form the light-block area.

In an embodiment of the present invention, the light-guide element has at least one turning part. In an embodiment, the light-guide element is configured to have an L-shaped structure due to the turning part.

In an embodiment of the present invention, the light-guide element is disposed with a plurality of micro-structures.

In an embodiment of the present invention, the micro-structures each are a groove or a particle.

In an embodiment of the present invention, the light-guide element further has a back surface opposite to the light-emission surface, and a plurality of micro-structures or ink areas are disposed on the back surface.

The present invention further provides an electronic product with a cursor-controllable function, which includes a display apparatus, the aforementioned positioning signal transmitter module and a cursor-controlling device. The display apparatus includes a display panel, a signal-receiving element and a circuit unit electrically connected to the display panel and the signal-receiving element. The circuit unit is configured to control the display panel to display a cursor. The positioning signal transmitter module is disposed beside the display panel. The cursor-controlling device includes a sensor module for sensing the light signal provided by the positioning signal transmitter module. The cursor-controlling device is configured to output a control signal according to a variation of the light signal sensed by the sensor module. The circuit unit controls the movement of the cursor according to the control signal received by the signal-receiving element.

In an embodiment of the present invention, the display apparatus further includes a housing; and the signal-receiving element, the circuit unit and the positioning signal transmitter module are disposed in the housing.

In summary, through disposing the light source(s) beside the light-guide element, the positioning signal transmitter module according to the present invention can have a relatively thin thickness. Consequently, the display apparatus of the electronic product with a cursor-controllable function according to the present invention can have a thin-frame design through adopting the aforementioned positioning signal transmitter module.

For making the above and other purposes, features and benefits become more readily apparent to those ordinarily skilled in the art, the preferred embodiments and the detailed descriptions with accompanying drawings will be put forward in the following descriptions.

DETAILED DESCRIPTION OF PREFERRED EMBODIMENTS

What are probed into the invention are a positioning signal transmitter module and an electronic product with a cursor-controllable function using the same. Detail descriptions of the steps and compositions will be provided in the following in order to make the invention thoroughly understood. Obviously, the application of the invention is not confined to specific details familiar to those who are skilled in the art. On the other hand, the common steps and compositions that are known to everyone are not described in details to avoid unnecessary limits of the invention. Some preferred embodiments of the present invention will now be described in greater detail in the following. However, it should be recognized that the present invention can be practiced in a wide range of other embodiments besides those explicitly described, that is, this invention can also be applied extensively to other embodiments, and the scope of the present invention is expressly not limited except as specified in the accompanying claims.

Figure 1:
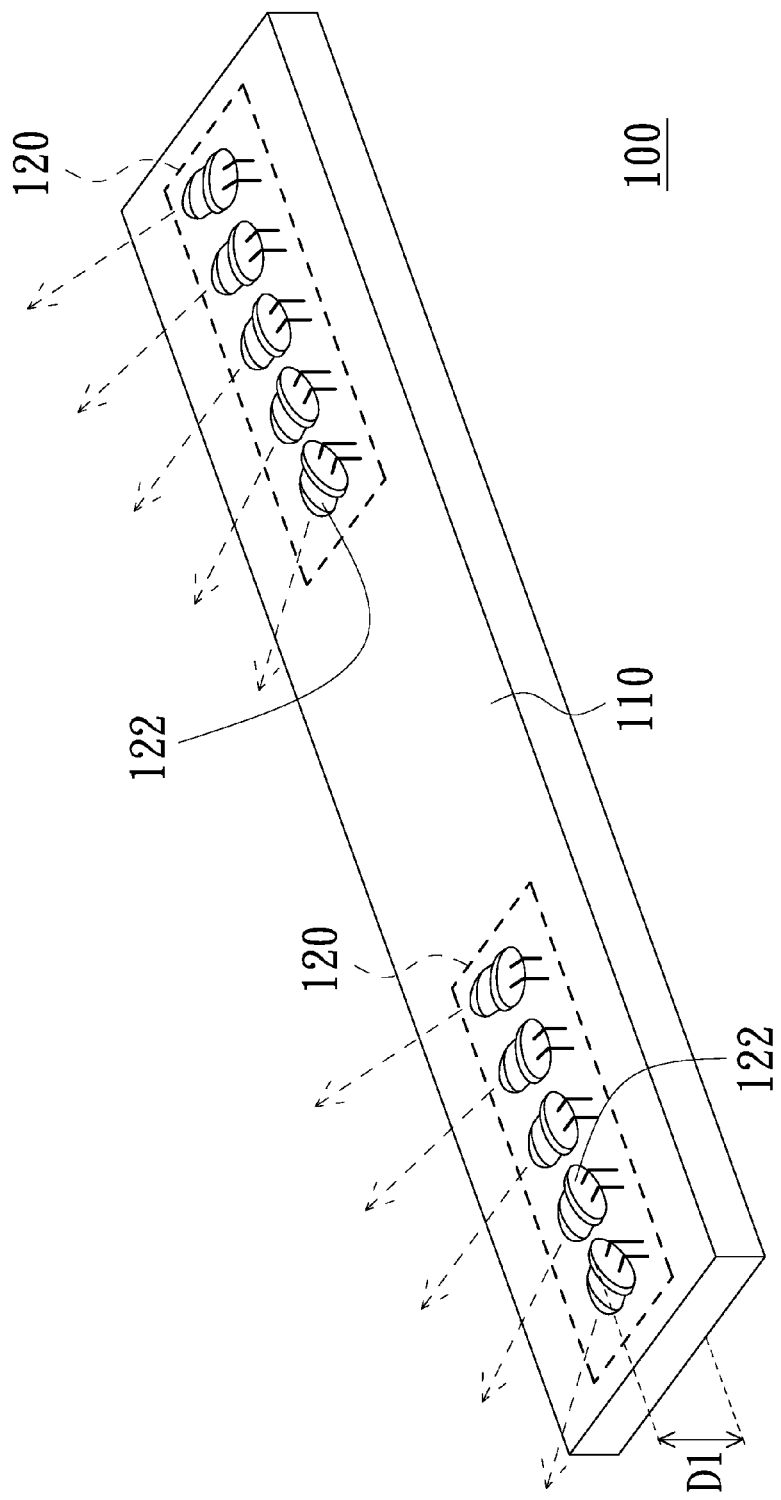
FIG. 1 is a schematic structural view of a positioning signal transmitter module of prior art.
Figure 2:
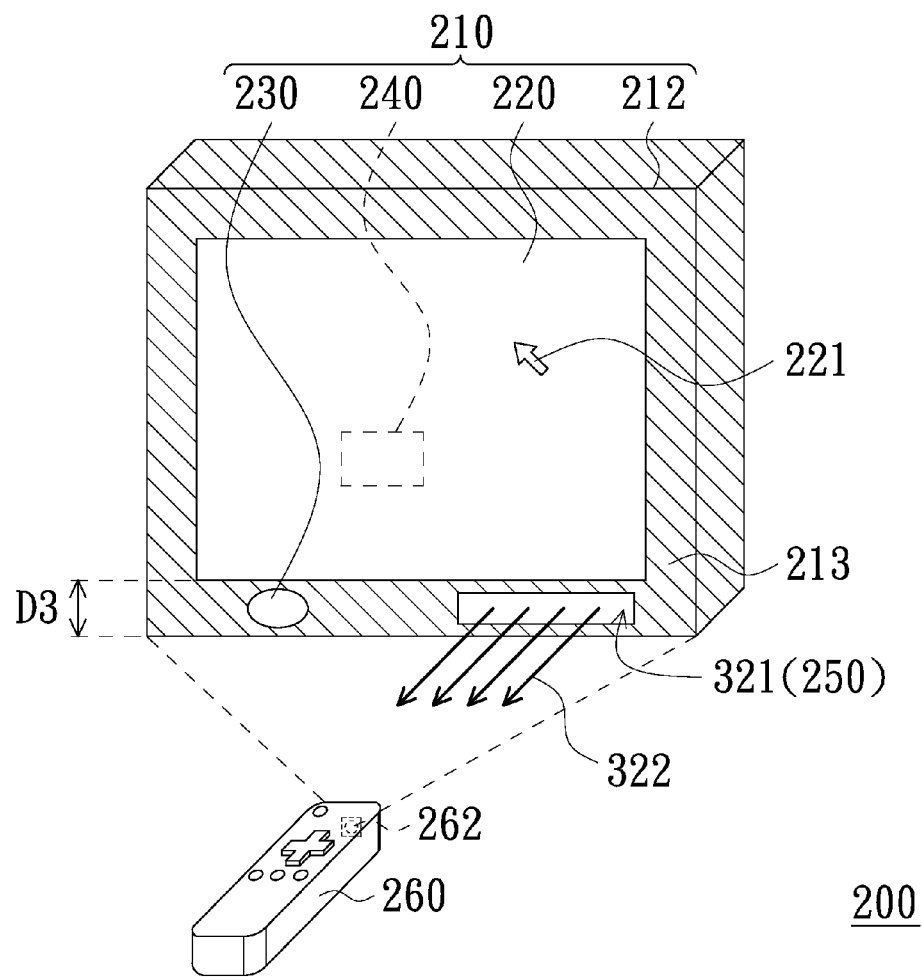
FIG. 2 is schematic view of an electronic product with a cursors-controllable function in accordance with an embodiment of the present invention.

FIG. 2 is schematic view of an electronic product with a cursors-controllable function in accordance with an embodiment of the present invention. As shown, the electronic product 200 with a cursors-controllable function includes a display apparatus 210, a positioning signal transmitter module 250 and a cursor-controlling device 260. The display apparatus 210 includes a display panel 220, a signal-receiving element 230 and a circuit unit 240. The circuit unit 240 is electrically connected to the display panel 220 and the signal-receiving element 230 and configured to control the display panel 220 to display a cursor 221 or other images. In particular, the circuit unit 240 is, for example, implemented by a specific circuit or a signal processor configured to execute specific program codes. The positioning signal transmitter module 250 is disposed beside the display panel 220 and configured to provide light signal 322. Moreover, the display apparatus 210 further includes a housing 212, in which the display panel 220, the signal-receiving element 230 and the circuit unit 240 are disposed. In addition, the signal-receiving element 230 and the positioning signal transmitter module 250 are disposed on a frame 213 of the housing 212.

The cursor-controlling device 260 includes a sensor module 262 configured to sense the light signal 322. Specifically, the cursor-controlling device 260 is configured to provide corresponding control signal according to the variations of the light signal 322 sensed by the sensor module 262; and consequently the circuit unit 240 moves the cursor 221 on the display panel 220 according to the control signal received by the signal-receiving element 230. In particular, the sensor module 262 includes, for example, a plurality of photosensitive pixels (not shown) arranged in an array format. Therefore, when a user moves or rotates the cursor-controlling device 260, the photosensitive pixels of the sensor module 262 can sense the variations of the pixel positions of the light signals 322 and accordingly output a corresponding control signal. After being received by the signal-receiving element 230, the control signal is then transmitted to the circuit unit 240, and the circuit unit 240 can drive the display panel 220 according to the received control signal to change the position of the cursor 221.

Figure 3A:
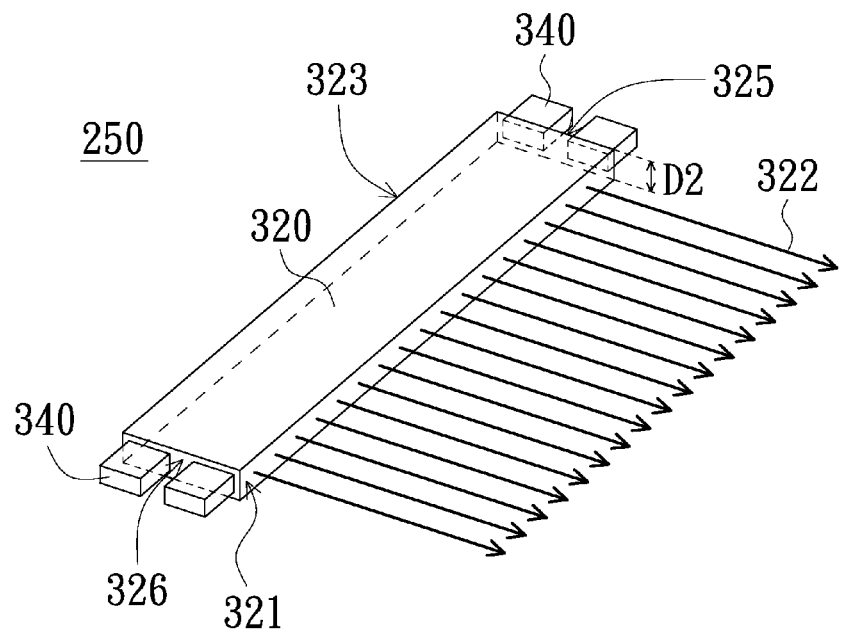
FIG. 3A is a schematic three-dimensional view of the positioning signal transmitter module shown in FIG. 2.

FIG. 3A is a schematic three-dimensional view of the positioning signal transmitter module 250 shown in FIG. 2. Please refer to the FIGS. 2, 3A both. The positioning signal transmitter module 250, configured to emit identifiable light source (that is, the light signal 322) to the corresponding cursor-controlling device 260 for the controlling of a cursor, includes a light-guide element 320 and at least one light source 340; wherein the positioning signal transmitter module 250 in this embodiment is exemplified by including more than one light source 340. The light-guide element 320 includes a light-emission surface 321, a back surface 323 opposite to the light-emission surface 321 and at least one light-incidence surface adjacent to the light-emission surface 321; wherein the light-guide element 320 in this embodiment is exemplified by including two light-incidence surface 325, 326, and it is understood that the light-guide element 320 may include one light-incidence surface only in another embodiment. In addition, the light-emission surface 321 is exposed from the frame 213 of the housing 212. The light-incidence surfaces 325, 326 each are corresponding to one or more light sources 340. The light signal 322 provided by the light sources 340 firstly is emitted into the light-guide element 320 through the light-incidence surfaces 325, 326 thereof and then directed to emit out from the light-emission surface 321. The light sources 340 each may be light-emitting diodes (LEDs), laser diodes or other types of point light sources; specifically, the light-emitting diode may be a surface-mount-device LED (SMD LED) or an LED with other packaged types.

In this embodiment, because the light sources 340 are disposed at two opposite sides of the light-guide element 320, the positioning signal transmitter module 250 can be designed to have a reduced thickness approximately equal to the thickness D2 (for example, about 3 mm or less) of the light-guide element 320. Thus, the positioning signal transmitter module 250 according to the present invention can have a significantly-reduced thickness. In addition, the display device 210 can have a thin-frame design due to the frame 213 can be reduced width D3 consequently.

It is to be noted that the internal or the surfaces (for example, the light-emission surface 321) of the light-guide element 320 may be configured to have a plurality of micro-structures (not shown) for modulating the light-emission properties thereof. For example, the micro-structures can be configured to enhance the uniformity of the light emitted from the light-emission surface 321 in response to a specific requirement; or, the micro-structures can be configured to divide the light-emission surface 321 into one or more bright areas and dark areas and thus the variations of the pixel position of the light signal 322 sensed by the sensing module 262 can be determined more accurately. The micro-structures each are, for example, a diffuse-particle disposed in the internal of the light-guide element 320, or, a diffuse-particle or a groove disposed on the light-emission surface 321. Specifically, in the case of the micro-structure being a diffuse-particle, the light-guide element 320 can have a specific light-emission property through arranging these diffuse-particles to have various distribution densities in different blocks. For example, because the light close to the light source 340 is relatively strong and the light far away the light source 340 is relatively weak, in this embodiment the distribution density of the diffuse-particles close to the light source 340 is configured to be relatively low and the distribution density of the diffuse-particles far away the light source 340 is configured to be relatively high; and thus, the light-emission surface 321 can have an improved light-emission uniformity. In another case, through configuring the diffuse-particles to have a relatively high distribution density in the area close to the two light sources 340 and have a relatively low distribution density in the area far away to the two light sources 340, the light-emission surface 321 can have, for example, two bright areas respectively adjacent to light-incidence surfaces 325, 326 and one dark area formed between the two bright areas; and thus, the light-guide element 320 can have a specific light-emission property.

Figure 3B:
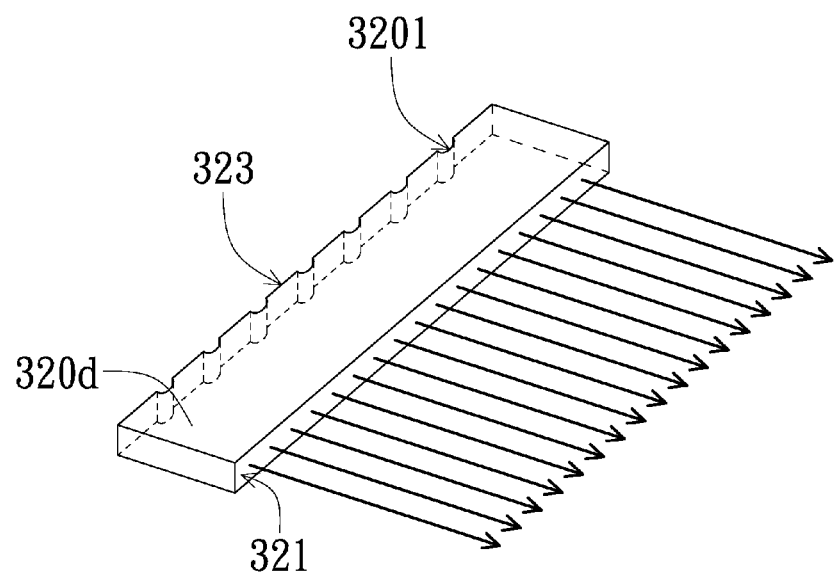
FIG. 3B is a schematic three-dimensional view of a light-guide element having groove structure on the back surface thereof in accordance with an embodiment of the present invention.
Figure 3C:
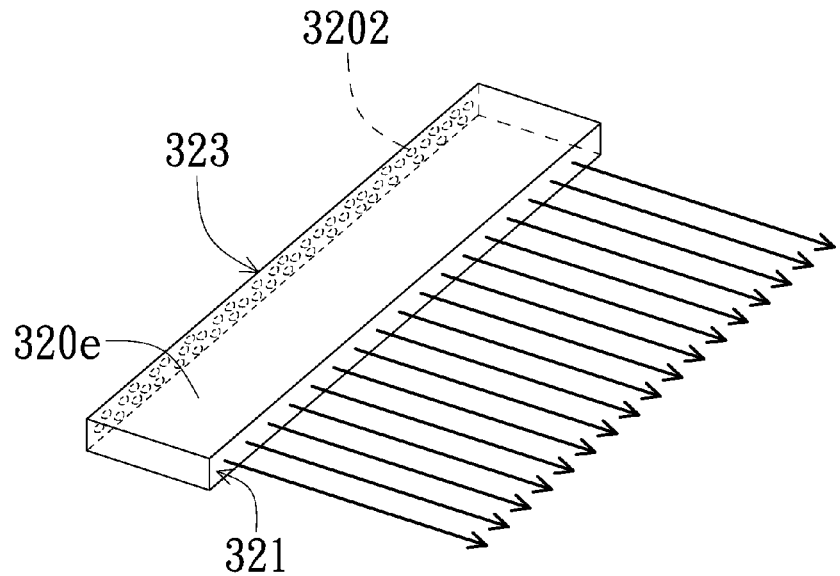
FIG. 3C is a schematic three-dimensional view of a light-guide element having diffuse-particles on the back surface thereof in accordance with another embodiment of the present invention.
Figure 3D:
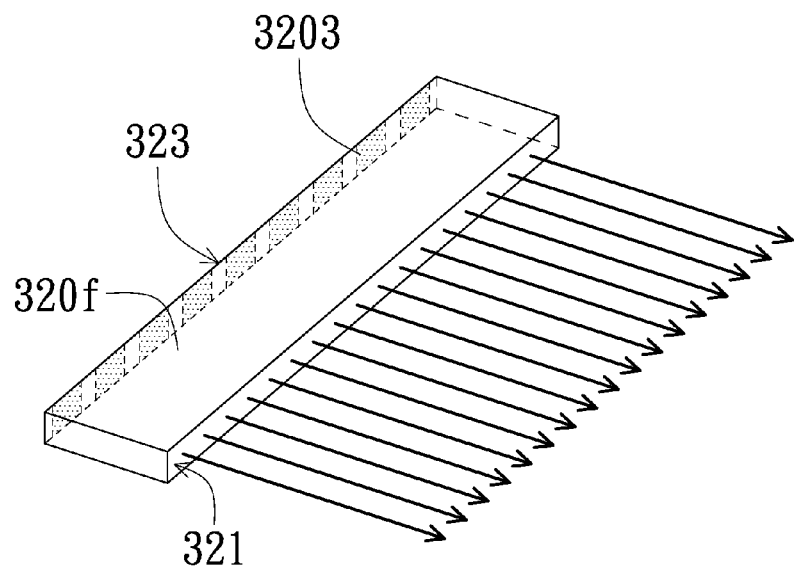
FIG. 3D is a schematic three-dimensional view of a light-guide element having ink areas on the back surface thereof in accordance with another embodiment of the present invention.

It is to be noted that, to further improve the light-emission uniformity of the light-emission surface 321, the back surface 323 opposite to the light-emission surface 321 can be also disposed with the micro-structures or ink areas. In summary, the aforementioned micro-structures can be grooves, diffuse-particles or inks areas, and no limitation. For example, as illustrated in FIG. 3B, the micro-structures are presented by the grooves 3201 disposed on the back surface 323 of the light-guide element 320d. Or, as illustrated in FIG. 3C, the micro-structures are presented by the diffuse-particles 3202 disposed on the back surface 323 of the light-guide element 320e. Or, as illustrated in FIG. 3D, the micro-structures are presented by the inks areas 3203 disposed on the back surface 323 of the light-guide element 320f. In addition, the grooves 3201, the diffuse-particles 3202 and the ink areas 3203 disposed on the back surface 323 each can further function to prevent the full-reflection from occurring on the back surface 323 so as to enhance the diffusion effect of the light in the light-guide elements 320d, 320e and 320f, respectively; and consequently the light emitted out from the light-emission surface 321 has an improved light-emission uniformity. Moreover, the back surface 323 may be disposed with a reflective element(s) (not shown) configured to reflect the light emitted out from the back surface 323 back to the light-guide elements 320d, 320e or 320f; and thus, the light-guide elements 320d, 320e or 320f each can have a reduced light loss.

Figure 4:
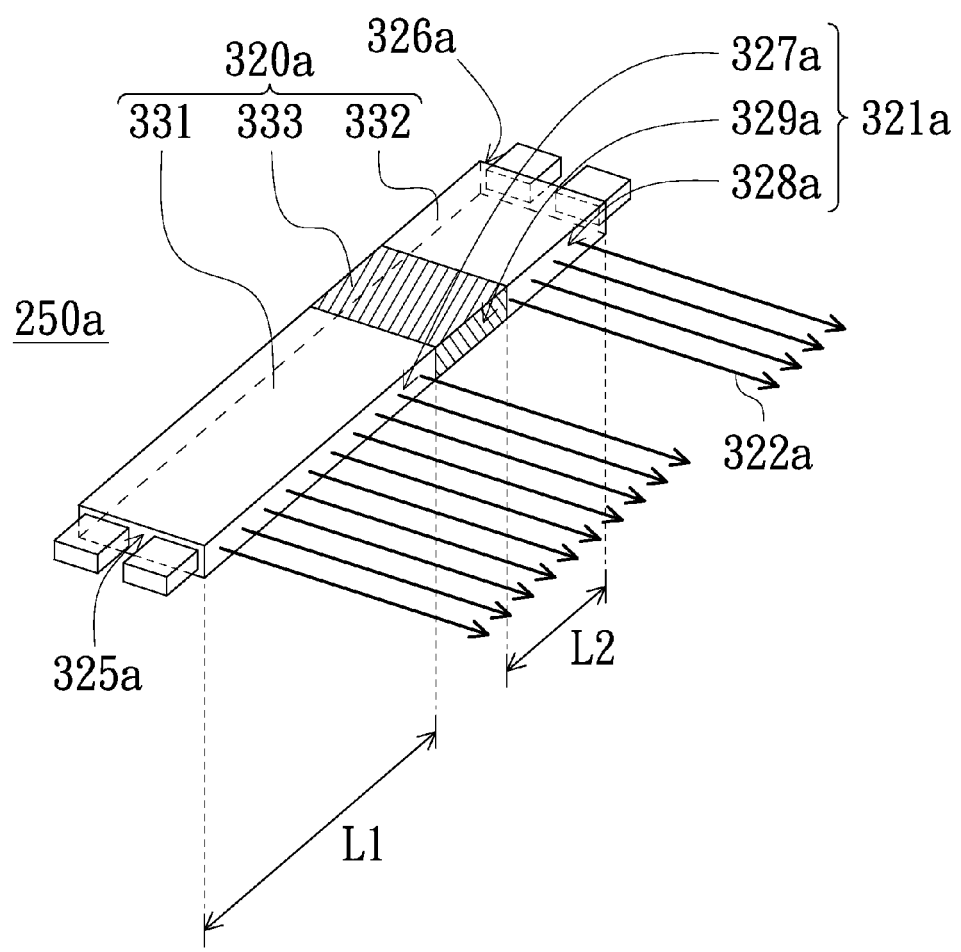
FIG. 4 is a schematic three-dimensional view of a positioning signal transmitter module in accordance with another embodiment of the present invention.

FIG. 4 is a schematic three-dimensional view of a positioning signal transmitter module in accordance with another embodiment of the present invention. As shown, according to the positioning signal transmitter module 250a in this embodiment, the light-guide element 320a has a first light-incidence surface 325a, a second light-incidence surface 326a opposite to the first light-incidence surface 325a, and a light-emission surface 321a. The light-emission surface 321a includes a first light-emission area 327a adjacent to the first light-incidence surface 325a, a second light-emission area 328a adjacent to the second light-incidence surface 326a and a light-block area 329a disposed between the first light-emission area 327a and the second light-emission area 328a. Based on the aforementioned structure, the light-guide element 320a is constituted by a first light-guide part 331, a second light-guide part 332 and a connection part 333; wherein the connection part 333 is connected between the first light-guide part 331 and the second light-guide part 332. In addition, the first light-incidence surface 325a and the first light-emission area 327a each are one of the surfaces of the first light-guide part 331; the second light-incidence surface 326a and the second light-emission area 328a each are one of the surfaces of the second light-guide part 332; and the light-block area 329a is one of the surfaces of the connection part 333. The connection part 333 may contain light-block materials; and thus, the light signal 322a emitted into the light-guide element 320a is limited to have a movement within the first light-guide part 331 and the second light-guide part 332 without entering into the connection part 333. Accordingly, the light signal 322a in the light-guide element 320a can only emit out from the light-emission surface 321a through the first light-emission area 327a and the second light-emission area 328a thereof.

In this embodiment, the first light-emission area 327a of the first light-guide part 331 may be configured to have a size different to that of the second light-emission area 328a of the second light-guide part 332. For example, the first light-emission area 327a is configured to have a length L1 which is greater than the length L2 of the second light-emission area 328a. Compared with the aforementioned positioning signal transmitter module 250, the positioning signal transmitter module 250a in this embodiment, due to having the different-sized first light-emitting area 327a and second light-emitting area 328a, can determine the rotation angle of the cursor-controlling device 260 (shown in FIG. 2) more accurately and consequently the cursor can be controlled more precisely. However, it is to be noted that the first light-emission area 327a and the second light-emission area 328a are not necessarily required to have different sizes in the present invention.

Figure 5:
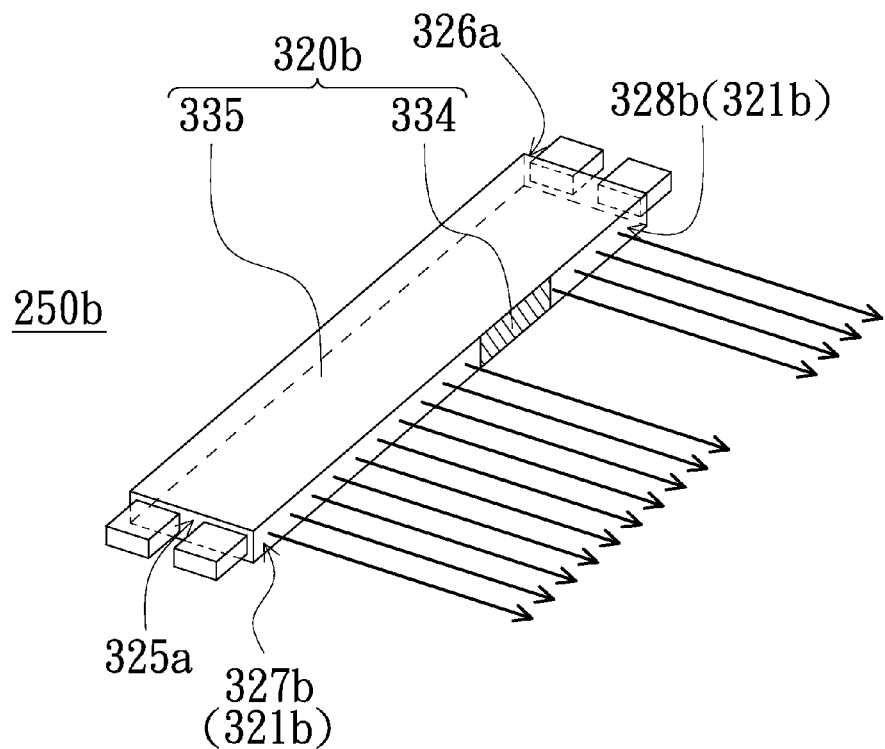
FIG. 5 is a schematic three-dimensional view of a positioning signal transmitter module in accordance with another embodiment of the present invention.

FIG. 5 is a schematic three-dimensional view of a positioning signal transmitter module in accordance with another embodiment of the present invention. As shown, the positioning signal transmitter module 250b in this embodiment has a structure and function similar to that of the positioning signal transmitter module 250a (shown in FIG. 4), and the main difference between the two is in the light-guide element. The light-guide element 320b includes a light-guide part 335 and a light-block layer 334. The light-guide part 335 has a light-emission surface 321b, a first light-incidence surface 325a and a second light-incidence surface 326a. The light-block layer 334 is disposed on the light-emission surface 321b and functions as a light-block area. In addition, the light-block layer 334 also functions to divide the light-emission surface 321b into a first light-emission area 327b and a second light-emission area 328b.

Figure 6:
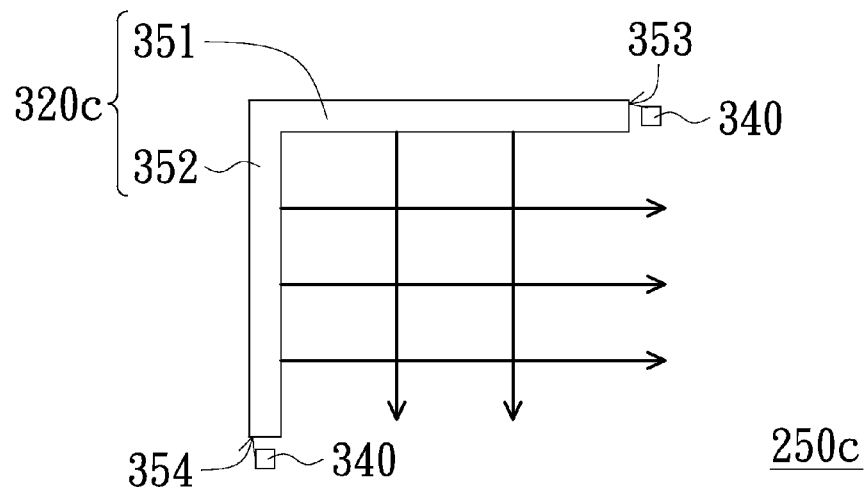
FIG. 6 is a schematic top view of a positioning signal transmitter module in accordance with another embodiment of the present invention.

The light-guide element in each aforementioned embodiment is exemplified by having a bar structure; however, it is understood that the light-guide element in other embodiments may be configured to have a structure with a different shape (for example, a tube structure or a structure having at least one turning part), and no limitation. FIG. 6 is a schematic view of a positioning signal transmitter module in accordance with another embodiment of the present invention. Please refer to FIGS. 2, 6 both. The positioning signal transmitter module 250c in this embodiment includes a light-guide element 320c and two light sources 340. The light-guide element 320c includes two light-guide parts 351, 352. Specifically, the light-guide parts 351, 352 are connected to each other and the connection part (or, the turning part) therebetween is configured to have a specific angle and thereby configuring the light-guide element 320c to have an L-shape structure. In addition, the light-guide part 351 has a first end 353 and the light-guide part 352 has a second end 354; and the two light sources 340 are disposed respectively at the first end 353 and the second end 354. Due to having the turning part, the positioning signal transmitter module 250c can determine the rotation angle of the cursor-controlling device 260 more accurately. In addition, it is to be noted that the light-guide parts 351, 352 may be configured to have a length different to each, so that the accuracy of the cursor controlling can be further improved.

Moreover, in order to reduce the light lose, it is to be noted that the other surfaces (except the light-incidence surface(s), the light-emission surface and the light-block area) of the light-guide element in each aforementioned embodiment may be coated with reflective materials or disposed with a reflective element(s) thereon.

In summary, through disposing the light source(s) beside the light-guide element, the positioning signal transmitter module according to the present invention can have a relatively thin thickness. Consequently, the display apparatus of the electronic product with a cursor-controllable function according to the present invention can have a thin-frame design through adopting the aforementioned positioning signal transmitter module. Furthermore, the electronic product with a cursor-controllable function according to the present invention can further have an improved cursor-controlling accuracy through adopting a light-guide element with a variety of specific structural designs.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A positioning signal transmitter module adapted to use with a cursor-controlling device corporately for a cursor controlling, comprising:
   a first light-guide element having a first light-emission surface and a first light-incidence surface adjacent to the first light-emission surface;
   a second light-guide element having a second light-emission surface and a second light-incidence surface adjacent to the second light-emission surface;
   an opaque connection part connected between the first and second light-guide elements;
   a first light source disposed beside the first light-incidence surface and configured to provide a first light signal to the first light-incidence surface, and
   a second light source disposed beside the second light-incidence surface and configured to provide a second light signal to the second light-incidence surface, the first and second light signals emitting out from the first and second light-emission surfaces, respectively;
   wherein the second light-incidence surface is opposite to the first light-incidence surface, the first light-emission surface is configured to have a size different to that of the second light-emission surface for recognizing a rotation angle of the cursor-controlling device and the cursor may therefore be precisely controlled, the opaque connection part is formed between the first and the second light-emission surfaces so as to define sizes of the first and second light-emission surfaces;
   wherein the first and second light-incidence surfaces are away from the opaque connection part, the first light signal may only emit out from the first light-emission surface, the second light signal may only emit out from the second light-emission surface.

2. The positioning signal transmitter module according to claim 1, wherein the first light-guide element comprises:
   a first light-guide part, the first light-incidence surface and the first light-emission surface each being one of surfaces of the first light-guide part;
   wherein the second light-guide element comprises:
   a second light-guide part, the second light-incidence surface and the second light-emission surface each being one of surfaces of the second light-guide part;
   wherein the opaque connection part is connected between the first and the second light-guide parts and has a light-block area being one of surfaces of the opaque connection part.

3. The positioning signal transmitter module according to claim 1, wherein the first and second light-guide elements are disposed with a plurality of micro-structures.

4. The positioning signal transmitter module according to claim 3, wherein each of the micro-structures is a groove or a particle.

5. The positioning signal transmitter module according to claim 1, wherein the first light-guide element further has a first back surface opposite to the first light-emission surface, the second light-guide element further has a second back surface opposite to the second light-emission surface, a plurality of micro-structures or ink areas are disposed on the first and second back surfaces.

6. An electronic product with a cursor-controllable function, comprising:
   a display apparatus comprising:
      a display panel;
      a signal-receiving element; and
      a circuit unit electrically connected to the display panel and the signal-receiving element and configured to control the display panel to display a cursor;
   a positioning signal transmitter module disposed beside the display panel and comprising:
      a first light-guide element having a first light-emission surface and at least a first light-incidence surface adjacent to the first light-emission surface;
      a second light-guide element having a second light-emission surface and at least a second light-incidence surface adjacent to the second light-emission surface;
      an opaque connection part connected between the first and second light-guide elements;
      a first light source disposed beside the first light-incidence surface and configured to provide a first light signal to the first light-incidence surface, and
      a second light source disposed beside the second light-incidence surface and configured to provide a second light signal to the second light-incidence surface, the first and second light signals emitting out from the first and second light-emission surfaces, respectively; and a cursor-controlling device comprising a sensor module for sensing the first and second light signals, the cursor-controlling device being configured to output a control signal according to a variation of the first and second light signals sensed by the sensor module;

wherein the circuit unit controls the movement of the cursor according to the control signal received by the signal-receiving element;

wherein the second light-incidence surface is opposite to the first light-incidence surface, the first light-emission surface is configured to have a size different to that of the second light-emission surface for recognizing a rotation angle of the cursor-controlling device and the cursor may therefore be precisely controlled, the opaque connection part is formed between the first and the second light-emission surfaces so as to define sizes of the first and second light-emission surfaces;

wherein the first light signal may only emit out from the first light-emission surface, the second light signal may only emit out from the second light-emission surface.

7. The electronic product with a cursor-controllable function according to claim 6, wherein the display apparatus further comprises a housing, and the signal-receiving element, the circuit unit and the positioning signal transmitter module are disposed in the housing.

8. The electronic product with a cursor-controllable function according to claim 6, wherein the first light-guide element comprises:

a first light-guide part, the first light-incidence surface and the first light-emission surface each being one of surfaces of the first light-guide part;

wherein the second light-guide element comprises:

a second light-guide part, the second light-incidence surface and the second light-emission surface each being one of surfaces of the second light-guide part;

wherein the opaque connection part is connected between the first and the second light-guide parts and has a light-block area being one of surfaces of the opaque connection part.

9. The electronic product with a cursor-controllable function according to claim 6, wherein the first and second light-guide elements are disposed with a plurality of micro-structures.

10. The electronic product with a cursor-controllable function according to claim 6, wherein each of the micro-structures is a groove or a particle.

11. The electronic product with a cursor-controllable function according to claim 6, wherein the first light-guide element further has a first back surface opposite to the first light-emission surface, the second light-guide element further has a second back surface opposite to the second light-emission surface, a plurality of micro-structures or ink areas are disposed on the first and second back surfaces.

* * * * *